United States Patent
Corazza

(10) Patent No.: US 6,563,810 B1
(45) Date of Patent: May 13, 2003

(54) CLOSED LOOP RESOURCE ALLOCATION

(75) Inventor: Giovanni E. Corazza, Bologna (IT)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/409,981

(22) Filed: Sep. 30, 1999

(51) Int. Cl.⁷ .............................. H04B 7/216; H04J 3/16
(52) U.S. Cl. ...................................... 370/335; 370/465
(58) Field of Search .................................. 370/335, 318, 370/252, 465, 468, 230, 235, 331, 342, 329, 412, 431, 441, 450, 522, 433, 437, 454, 456, 459; 455/69, 450, 438, 452, 453, 445, 442, 451

(56) References Cited

U.S. PATENT DOCUMENTS

| | | | |
|---|---|---|---|
| 4,901,307 A | 2/1990 | Gilhousen et al. | 370/18 |
| 5,103,459 A | 4/1992 | Gilhousen et al. | 375/1 |
| 5,267,261 A | 11/1993 | Blakeney, II et al. | 375/1 |
| 5,442,625 A * | 8/1995 | Gitlin et al. | 370/468 |
| 5,504,773 A | 4/1996 | Padovani et al. | 375/200 |
| 5,734,646 A * | 3/1998 | I et al. | 370/335 |
| 5,754,554 A * | 5/1998 | Nakahara | 370/336 |
| 5,784,360 A * | 7/1998 | I et al. | 370/252 |
| 5,825,761 A * | 10/1998 | Tanaka et al. | 370/333 |
| 5,933,462 A | 8/1999 | Viterbi et al. | 375/341 |
| 5,933,777 A * | 8/1999 | Rahman | 455/450 |
| 5,933,787 A | 8/1999 | Gilhousen et al. | 455/562 |
| 6,072,784 A * | 6/2000 | Agrawal et al. | 370/311 |
| 6,104,933 A * | 8/2000 | Frodigh et al. | 455/522 |
| 6,137,789 A * | 10/2000 | Honkasalo | 455/522 |

FOREIGN PATENT DOCUMENTS

| | | |
|---|---|---|
| WO | 9909779 | 2/1999 |
| WO | 9917582 | 4/1999 |
| WO | 0103357 | 1/2001 |

* cited by examiner

Primary Examiner—Chau Nguyen
Assistant Examiner—Chiho A Lee
(74) Attorney, Agent, or Firm—Philip R. Wadsworth; Kent D. Baker; Sean English

(57) ABSTRACT

Method and apparatus for performing transmission data rate allocation in a high speed wireless communications network. A macro control loop with the network of base stations on one side and all the subscriber stations on the other side. Subscriber station selects a rate based on the amount of data queued for transmission (100). Adjusts this rate based on the available power headroom of the subscriber station (102). This adjusted transmission rate is then adjusted again to account for protection of base stations in the candidate set of the subscriber station (104). This rate is then adjusted in accordance with busy tone signals indicative of the loading conditions of active set base stations of the subscriber station (108). The base stations react to these action by refreshing measurements of their instantaneous traffic load and providing feedback in the form of soft busy tones. The algorithm is named Closed Loop Resource Allocation.

51 Claims, 10 Drawing Sheets

CLOSED LOOP RESOURCE ALLOCATION

BACKGROUND OF THE INVENTION

I. Field of the Invention

The present invention relates to wireless communications. More particularly, the present invention relates to a novel and improved method and apparatus for determining the transmission data rates in a high speed wireless communication system.

II. Description of the Related Art

A modern day communication system is required to support a variety of applications. One such communication system is a code division multiple access (CDMA) system which conforms to the "TIA/EIA/IS-95 Subscriber station-Base Station Compatibility Standard for Dual-Mode Wideband Spread Spectrum Cellular System", hereinafter referred to as the IS-95 standard. The CDMA system allows for voice and data communications between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", and U.S. Pat. No. 5,103,459, entitled "SYSTEM AND METHOD FOR GENERATING WAVEFORMS IN A CDMA CELLULAR TELEPHONE SYSTEM", both assigned to the assignee of the present invention and incorporated by reference herein.

In this specification, base station refers to the hardware with which the subscriber stations communicate. Cell refers to the hardware or the geographic coverage area, depending on the context in which the term is used. A sector is a partition of a cell. Because a sector of a CDMA system has the attributes of a cell, the teachings described in terms of cells are readily extended to sectors.

In the CDMA system, communications between users are conducted through one or more base stations. A first user on one subscriber station communicates to a second user on a second subscriber station by transmitting data on the reverse link to a base station. The base station receives the data and can route the data to another base station. The data is transmitted on the forward link of the same base station, or a second base station, to the second subscriber station. The forward link refers to transmission from the base station to a subscriber station and the reverse link refers to transmission from the subscriber station to a base station. In IS-95 systems, the forward link and the reverse link are allocated separate frequencies.

The subscriber station communicates with at least one base station during a communication. CDMA subscriber stations are capable of communicating with multiple base stations simultaneously during soft handoff. Soft handoff is the process of establishing a link with a new base station before breaking the link with the previous base station. Soft handoff minimizes the probability of dropped calls. The method and system for providing a communication with a subscriber station through more than one base station during the soft handoff process are disclosed in U.S. Pat. No. 5,267,261, entitled "MOBILE ASSISTED SOFT HANDOFF IN A CDMA CELLULAR TELEPHONE SYSTEM," assigned to the assignee of the present invention and incorporated by reference herein. Softer handoff is the process whereby the communication occurs over multiple sectors which are serviced by the same base station. The process of softer handoff is described in detail in copending U.S. patent application Ser. No. 08/763,498, entitled "METHOD AND APPARATUS FOR PERFORMING HANDOFF BETWEEN SECTORS OF A COMMON BASE STATION", filed Dec. 11, 1996, now U.S. Pat. No. 5,933,787, issued Aug. 3, 1999, by Klein S. Gilheousen, assigned to the assignee of the present invention and incorporated by reference herein.

Given the growing demand for wireless data applications, the need for very efficient wireless data communication systems has become increasingly significant. The IS-95 standard is capable of transmitting traffic data and voice data over the forward and reverse links. A method for transmitting traffic data in code channel frames of fixed size is described in detail in U.S. Pat. No. 5,504,773, entitled "METHOD AND APPARATUS FOR THE FORMATTING OF DATA FOR TRANSMISSION", assigned to the assignee of the present invention and incorporated by reference herein. In accordance with the IS-95 standard, the traffic data or voice data is partitioned into code channel frames which are 20 msec wide with data rates as high as 14.4 Kbps.

A system completely dedicated to high speed wireless communications is disclosed in copending U.S. patent application Ser. No. 08/963,386 (the '386 application), filed Nov. 3, 1997, entitled, "METHOD AND APPARATUS FOR HIGHER RATE PACKET DATA TRANSMISSION", which is assigned to the assignee of the present invention and incorporated by reference herein. In the '386 application, the base station transmits to subscriber stations by sending frames that include a pilot burst time multiplexed in to the frame and transmitted at a rate based on channel information transmitted from the subscriber station to the base station.

A significant difference between voice services and data services is the fact that the former imposes stringent and fixed delay requirements. Typically, the overall one-way delay of speech frames must be less than 100 msec. In contrast, the data delay can become a variable parameter used to optimize the efficiency of the data communication system. Specifically, more efficient error correcting coding techniques which require significantly larger delays than those that can be tolerated by voice services can be utilized. An exemplary efficient coding scheme for data is disclosed in U.S. patent application Ser. No. 08/743,688, entitled "SOFT DECISION OUTPUT DECODER FOR DECODING CONVOLUTIONALLY ENCODED CODEWORDS", filed Nov. 6, 1996, now U.S. Pat. No. 5,933,462, issued Aug. 3, 1999, by N.T. Sindhushayana, et al., assigned to the assignee of the present invention and incorporated by reference herein.

Another significant difference between voice services and data services is that the former requires a fixed and common quality of service (QOS) for all users. Typically, for digital systems providing voice services, this translates into a fixed and equal transmission rate for all users and a maximum tolerable value for the error rates of the speech frames. In contrast, for data services, the QOS can be different from user to user, can be negotiated, and should be subject to some fairness constraints. The QOS that a data communication system provides to a subscriber is typically described by the delay, average throughput, blockage probability, connection loss probability experienced during service time.

A wireless data communication system can typically provide a range of transmission data rates both in the forward and reverse links. These transmission data rates are allocated to the various active traffic sources according to a strategy, identified as medium access control that must account for the fact that the sources typically offer different incoming information data rates, depending essentially on the selected data application. Also, channel conditions and overall system load should be considered when allocating transmission data rate to a specific subscriber.

Medium access control amounts to allocating the resource to the active subscriber stations in the network in a way that optimizes the trade-off between overall system throughput, QOS, and algorithm complexity. While in the forward link one can exploit the "one-to-many" nature of the transmission to perform optimal centralized resource allocation at the base station, in the "many-to-one" reverse link the problem of optimization of the medium access control strategy is complex, and can be solved with a centralized approach at the base station, or with a distributed approach at the subscriber stations. Although many of the techniques described herein may be extended to the medium access control of the forward link signals, the focus of the present invention is set on medium access control for the reverse link.

The information that should be used to perform resource allocation in the reverse link resides both at the network of base stations and at the subscriber stations. Specifically, at the network side resides the information pertaining to the instantaneous traffic load and spare capacity of each base station. The load can be quantified for example by the rise of the overall received energy over the floor set by the noise power spectral density. The spare capacity is the difference between the maximum allowable load that prevents network instability and the instantaneous load. At the subscriber station resides information about terminal class (for example maximum transmission power, transmission buffer size, supported data rate set), channel conditions (for example signal-to-noise plus interference ratio for all received pilots, transmit power headroom), and traffic source state (for example buffer state, buffer overflow, average throughput in the past, delay statistics). In principle, information can be exchanged between the network and the subscribers, but this involves signaling over the air interface which implies a waste of resources and a delay in the decision making process.

A first problem is therefore to design a medium access control strategy for the reverse link that exploits in an optimal way the available information minimizing signaling messages. Also, it is desirable for the medium access control strategy to be robust in terms of changes in the subscriber station class and in the network topology. Another fundamental problem is resource allocation for a subscriber station in soft handoff. In this case the traffic load and spare capacity of all base stations involved in the soft-handoff (identified as base stations in the active set) must be considered, again possibly minimizing signaling in the network. Yet another fundamental problem is protection of base stations that are not in soft handoff with a particular subscriber station, but that nevertheless are connected to that subscriber station through an electromagnetic link with path loss comparable to those measured in the active set. These base stations are referred to herein as the candidate set.

The present invention, described in the following, is an efficient and novel method and apparatus designed to address and solve all the above mentioned fundamental problems for a reverse link medium access control strategy.

SUMMARY OF THE INVENTION

The present invention is a novel and improved method and apparatus for performing transmission data rate allocation in the reverse link of a high speed wireless communications network. The present invention forms a macro control loop with the network of base stations on one side and all the subscriber stations on the other side. Each subscriber station selects a data rate based on the amount of data queued for transmission. Adjusts this rate based on the available power headroom. This adjusted transmission rate is then adjusted again to account for protection of base stations in the candidate set of the subscriber station. This rate is then adjusted in accordance with signals indicative of the loading conditions of active set base stations of the subscriber station. The base stations react to the subscriber stations action by measuring their instantaneous traffic load and providing feedback in the form of soft busy tones. The method is referred to herein as Closed Loop Resource Allocation.

It is an objective of the present invention to optimize reverse link medium access control by placing the data rate allocation under the control of the subscriber station which has a greater amount of information by which to determine the transmission rate than do the elements on the network side. The subscriber has information regarding the amount of information it has queued to transmit, and the amount of available transmit power headroom, the signal-to-noise plus interference ratios in both the active set and the candidate set links, all of which are essential factors in selecting a reverse link transmission rate. The base stations do not have this information absent a significant amount of signaling, which is undesirable.

It is another objective of the present invention to prevent a subscriber station from creating unacceptable interference to candidate base stations by its reverse link transmission, thus enforcing candidate set protection.

It is another objective of the present invention to allow data rate allocation on a per-packet basis, to provide the flexibility that is necessary to provide efficient service to subscriber stations offering traffic with high burstiness.

It is another objective of the present invention to provide fairness in resource allocation among the subscriber stations by taking into account the average throughput in the recent past and the possible buffer overflow condition.

It is another objective of this invention to provide efficient reverse link medium access control without requiring any signaling in the backhaul, between base station transceivers and base station controllers, even when the subscriber station is in soft handoff. This is highly desirable because it makes resource allocation independent from the network architecture and the associated transmission and processing delays.

It is another objective of the present invention to minimize the necessary signaling on the air interface.

It is another objective of the present invention to avoid resource waste that occurs when the rate used by the subscriber station is smaller than the allocated rate. In fact, in closed loop resource allocation the allocated rate and the used rate are always coincident.

It is yet another objective of the present invention to provide soft multi-bit busy tones that indicate not only whether a base station is in an overload condition or not, but also provides some indication of the extent of its loading.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

I. Method Overview

Figure 1A:
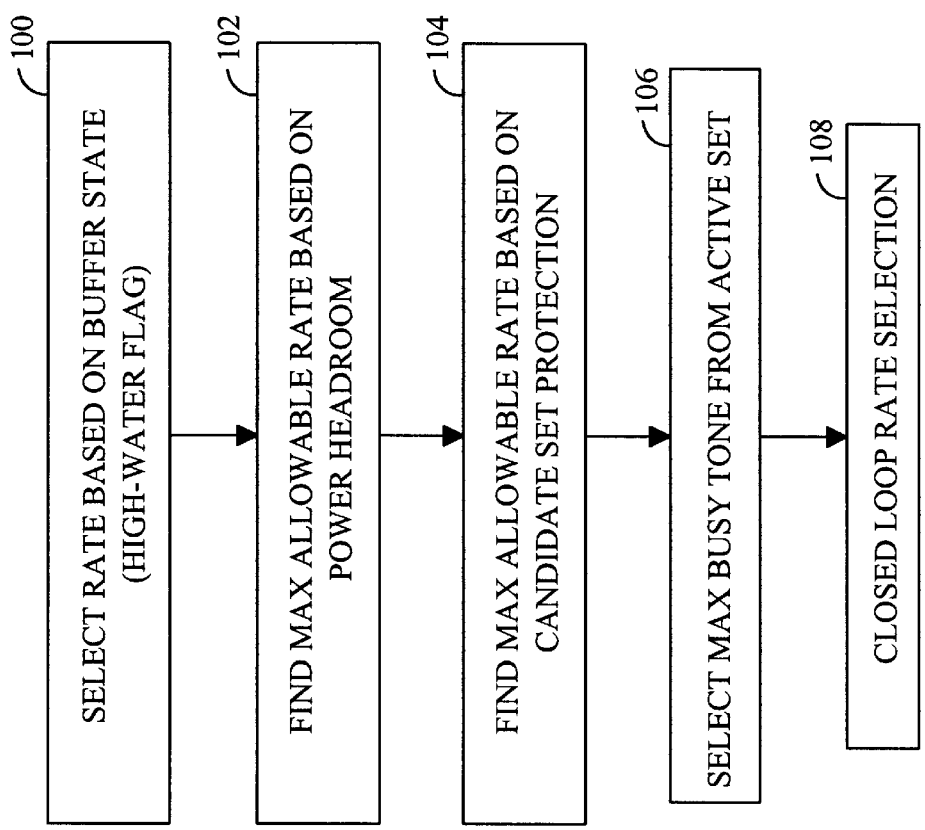
FIGS. 1A–1F are flowcharts illustrating the method of rate allocation of the present invention.

FIG. 1A is a flowchart describing the preferred method of performing closed loop resource allocation according to the present invention. It will be understood by one skilled in the art that the steps illustrated in FIG. 1A represent no preferred ordering sequence and that the order of the steps may be changed without departing from the scope of the present invention. Moreover, steps of the present invention may be eliminated altogether without departing from the scope of the present invention. In the exemplary embodiment, the present invention is employed to determine the data rate of reverse link transmissions from a subscriber station. In block 100, the subscriber station selects an initial desired rate ($R_{step1}$) based on the buffer state. In the exemplary embodiment, the data rate is determined on a per packet basis.

Figure 1B:
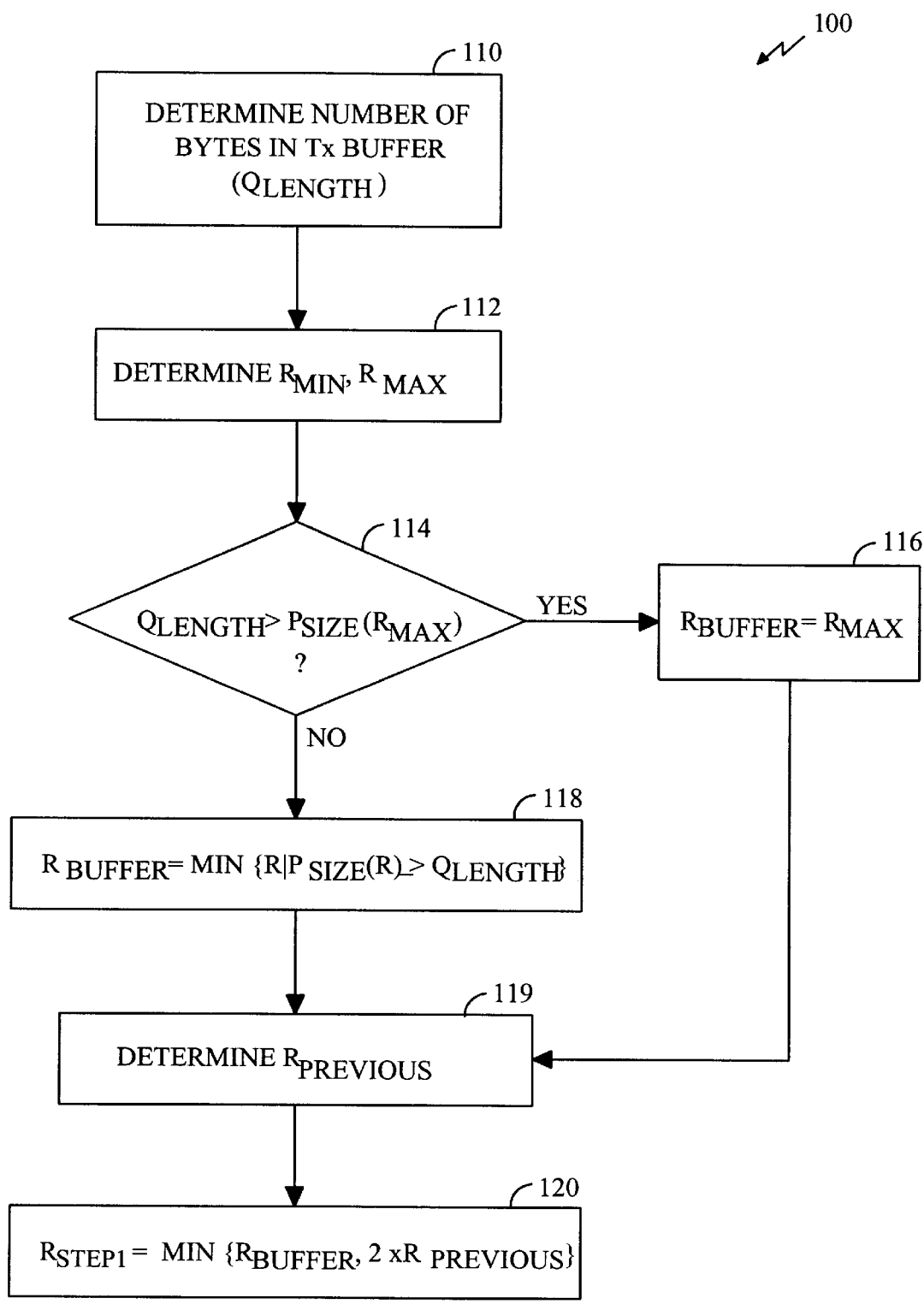

FIG. 1B is a flowchart describing the rate selection based on the buffer state in greater detail. In block 110, the subscriber station determines the number of bytes in its transmit buffer ($Q_{length}$).

In block 112, the subscriber station determines the parameters $R_{min}$ and $R_{max}$. $R_{min}$ and $R_{max}$ are the minimum rate and the maximum rate at which the subscriber station is capable of transmitting. In the exemplary embodiment, $R_{max}$ for a particular subscriber station can optionally be set by the serving base station by means of over the air signaling. An exemplary set of rates (R) in Kbps and corresponding packet sizes ($P_{size}(R)$) in information bytes for those rates is illustrated in Table 1 below.

TABLE 1

| Rate (R) (kb/s) | 4.8 | 9.6 | 19.2 | 38.4 | 76.8 | 153.6 | 307.2 |
|---|---|---|---|---|---|---|---|
| Packet size (byte) ($P_{size}(R)$) | 32 | 64 | 128 | 256 | 512 | 1024 | 2048 |

In control block 114, the subscriber station determines whether the number of bytes of information in the transmit buffer is greater than the packet size for the maximum transmission rate. In the case of the exemplary numerology, the maximum rate is 307.2 Kbps and the corresponding maximum packet size is 2048 bytes. If the number of bytes of information in the transmit buffer is greater than the packet size for the maximum transmission rate, then in block 116 variable $R_{buffer}$ is set equal to $R_{max}$. If the number of bytes of information in the transmit buffer is not greater than the packet size for the maximum transmission rate, then in block 118 variable $R_{buffer}$ is set to the lowest available rate at which the entire contents of the transmit buffer ($Q_{lenght}$) can be transmitted in a single packet.

In block 119, the subscriber station determines the rate of its last transmission ($R_{previous}$). In the preferred embodiment, this value is stored in RAM and overwritten after each transmission. In block 120, a temporary rate variable $R_{step1}$ is set to the minimum of either the rate indicated by $R_{buffer}$ or twice the rate $R_{previous}$.

In the exemplary embodiment, the buffer of the subscriber station is separated into two portions. A first portion includes new data for transmission and the second portion includes RLP (Radio Link Protocol) data, which are packets that were previously transmitted but could be retransmitted. In the preferred embodiment, a flag $F_{buffer}$ is set when the new data buffer of the subscriber station is nearly full. In response to the setting of the nearly full buffer flag, the subscriber station adjusts is rate selection algorithm. In a first exemplary embodiment, the subscriber station adjusts the rate selection algorithm so as to bias its transmission rate to one of increasing the transmission rate, as will be described in greater detail further in. In an alternative embodiment, the subscriber station transmits at a predetermined higher rate. It will be understood that one skilled in art can modify the responses to the setting of a full buffer flag so as to increase the transmission rate in a variety of ways that are all within the scope of the present invention. For fairness, the $F_{buffer}$ flag should not be set for more than $N_{buffer}$ times (e.g. 25) out of the last 100 packets.

Figure 1C:
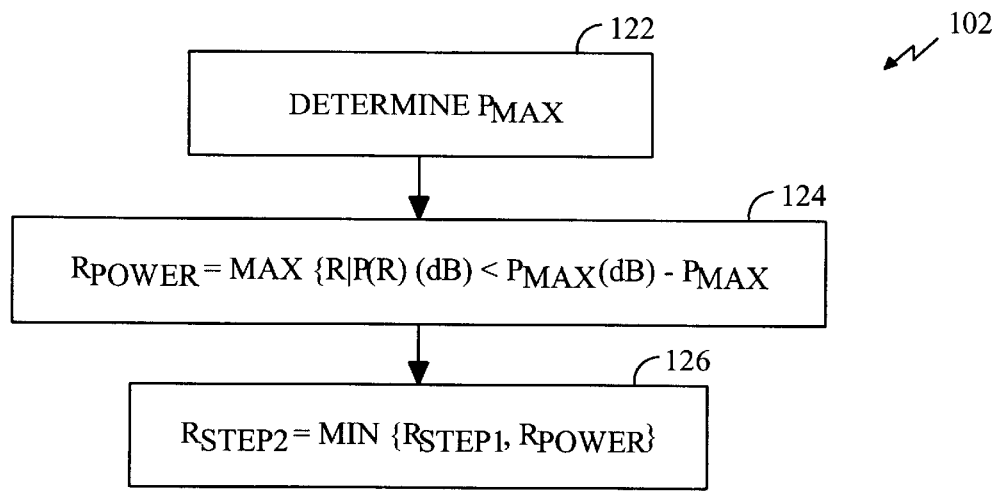

Returning to FIG. 1A, the operation moves to block 102 wherein the subscriber station determines the maximum rate based on the power headroom ($R_{step2}$). FIG. 1C illustrates the operation performed in step 102 is greater detail. In block 122, the subscriber station determines the maximum transmit power ($P_{max}$) at which the) subscriber station is capable of operating. In the exemplary embodiment, the maximum transmit power depends on the power amplifier in the subscriber station be it mobile or fixed, and on the amount of battery energy in the subscriber station if the subscriber station is mobile.

In block 124, the subscriber station computes a maximum allowed transmit power which is the maximum transmit power $P_{max}$ (dB) determined in step 122 less a power margin $P_{margin}$ (dB), that allows to track future power level fluctuations. Then, the subscriber station sets a variable $R_{power}$ equal to the max rate, R, which can be reliably transmitted with a power, P(R) (dB), less than the maximum allowed transmit power ($P_{max}(dB)-P_{margin}(dB)$). In block 126, the subscriber station sets a new variable $R_{step2}$ equal to the minimum of $R_{step1}$ determined in step 100 and $R_{power}$ determined in step 124.

Returning to FIG. 1A, the process then moves to block 104 where the subscriber station determines the maximum transmission rate in accordance with a candidate set protection criterion. The purpose of the rate adjustment in step 104 is to protect members of the candidate set of the subscriber station from having their reverse links overloaded by subscriber stations not in communication with them but which are sufficiently visible (in terms of path loss) to cause interference problems.

In the exemplary embodiment, the subscriber station is not informed of loading problems of base stations in the candidate set, because it does not receive the pertinent busy tone. Thus, the candidate set protection algorithm is provided for preventing uncontrolled overload of the candidate set base stations. In the exemplary embodiment, the amount of reduction in the maximum allowable rate of transmission is based upon the strength of the pilot signals from the candidate base stations. In particular, the strength of the pilot signals from the candidate base stations relative to the strength of the pilot signals from the active set base stations.

Figure 1D:
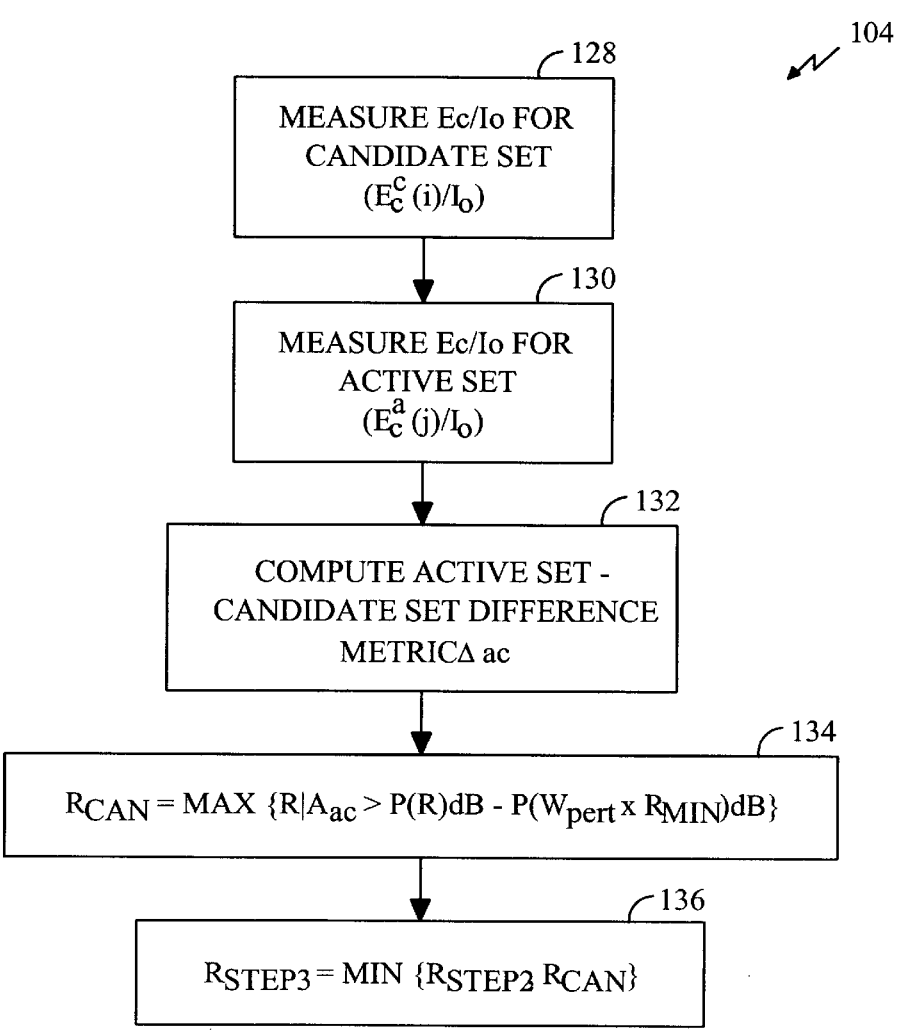

FIG. 1D illustrates the exemplary method for determining the maximum transmission rate in accordance with protection of the candidate set. In block 128, the subscriber station measures the Ec/Io of the pilot signals from each of the base stations in its candidate set which includes all the multipath components of the pilot signals from those base stations. In block 130, the subscriber station measures the Ec/Io of the pilot signals from each of the base stations in its active set which includes all the multipath components of the pilot signals from those base stations.

In block 132, the subscriber station computes a metric ($\Delta_{ac}$) that is a function of the difference in strength of the signals received by base stations in the active set and signals received by base stations in the candidate set. In the exemplary embodiment the metric ($\Delta_{ac}$) is set to the difference between the sum of the Ec/Io of the all members of the active set in decibels, and the sum of the Ec/Io of the all members in the candidate set in decibels, as illustrated in equation (1) below:

$$\Delta_{nc} = \left[\sum_i E_c^i(i)/I_o\right](dB) - \left[\sum_j E_c^r(j)/I_o\right](dB), \quad (1)$$

where $E_a{}^c(i)|I_o$ is the strength of the ith pilot of the active set including all related multipath components, and $E_c{}^c(j)|I_o$ is the strength of the jth pilot in the candidate set including all related multipath components.

In a first alternative embodiment, the metric ($\Delta_{ac}$) is set to the difference between the weakest member of the active set and the strongest member of the candidate set as illustrated in equation (2) below:

$$\Delta_{ac} = \min_i\{E_c{}^a(i)|I_o(dB)\} - \max_j\{E_c{}^c(j)|I_o(dB)\}, \quad (2)$$

where $E_c{}^a(i)|I_o$ is the strength of the ith pilot of the active set including all related multipath components, and $E_c{}^c(j)|I_o$ is the strength of the jth pilot in the candidate set including all related multipath components.

In a second alternative embodiment, the metric ($\Delta_{ac}$) is set to the difference between the weakest member of the active set and the sum of the members of the candidate set as illustrated in equation (3) below:

$$\Delta_{ac} = \min_i \{E_c^a(i)/I_o(dB)\} - \left[\sum_j E_c^c(j)/I_o\right](dB), \quad (3)$$

where $E_c{}^a(i)|I_o$ is the strength of the ith pilot of the active set including all related multipath components, and $E_c{}^c(j)|I_o$ is the strength of the jth pilot in the candidate set including all related multipath components.

In a third alternative embodiment, the metric ($\Delta_{ac}$) is set to the difference between the strongest member of the active set and the strongest member of the candidate set as illustrated in equation (4) below:

$$\Delta_{ac} = \max_i\{E_c{}^a(i)|I_o(dB)\} - \max_j\{E_c{}^c(j)|I_o(dB)\}, \quad (4)$$

where $E_c{}^a(i)|I_o$ is the strength of the ith pilot of the active set including all related multipath components, and $E_c{}^c(j)|I_o$ is the strength of the jth pilot in the candidate set including all related multipath components.

A fourth alternative embodiment computes the metric based on the selection of the pilot in the active set that is driving the power control algorithm.

Other methods of determining the metric will be evident to one skilled in the art and are within the scope of the present invention.

In block 134, a variable $R_{can}$ is set to the maximum rate (R) such that the difference between the power necessary to transmit a packet from the subscriber station at rate R, P(R) (dB), less a protection factor, exceeds the computed metric value ($\Delta_{ac}$). In the exemplary embodiment, the protection factor is determined as the power in decibels required to transmit at a rate that is equal to $N_{prot}$ times $R_{min}$ where $N_{prot}$ is an integer scaling factor and $R_{min}$ is the minimum rate at which the subscriber station is capable of transmitting.

In block 136, a variable $R_{step3}$, which is the adjusted rate after performing the candidate set protection operation, is determined by selecting the minimum rate of either $R_{step2}$ or $R_{can}$.

Returning to FIG. 1A, in block 106, the subscriber station selects the maximum busy tone from the ones received from all base stations in the active set. In a simple case, where the busy tone is a single bit indicative of either the reverse link capacity loading condition or the existence of additional reverse link capacity, the selection of the maximum busy tone is simply a matter of OR-ing all of the received busy tones. If any of the busy tones indicates a capacity loading condition, the subscriber station stochastically reduces the rate of its transmissions, as described later. If all the busy tones indicate additional reverse link capacity, then the subscriber station stochastically increases its transmission rate, as described later.

In the preferred embodiment, the busy tone is a soft multi-bit busy tone, namely with two bits (b1,b2) which corresponds to the meanings in Table 2 below.

TABLE 2

| (b1,b2) | Meaning |
|---|---|
| (0,0) | Base Station Scarcely Loaded |
| (0,1) | Base Station Stable |
| (1,0) | Base Station Highly Loaded |
| (1,1) | Base Station Overload |

Figure 1E:
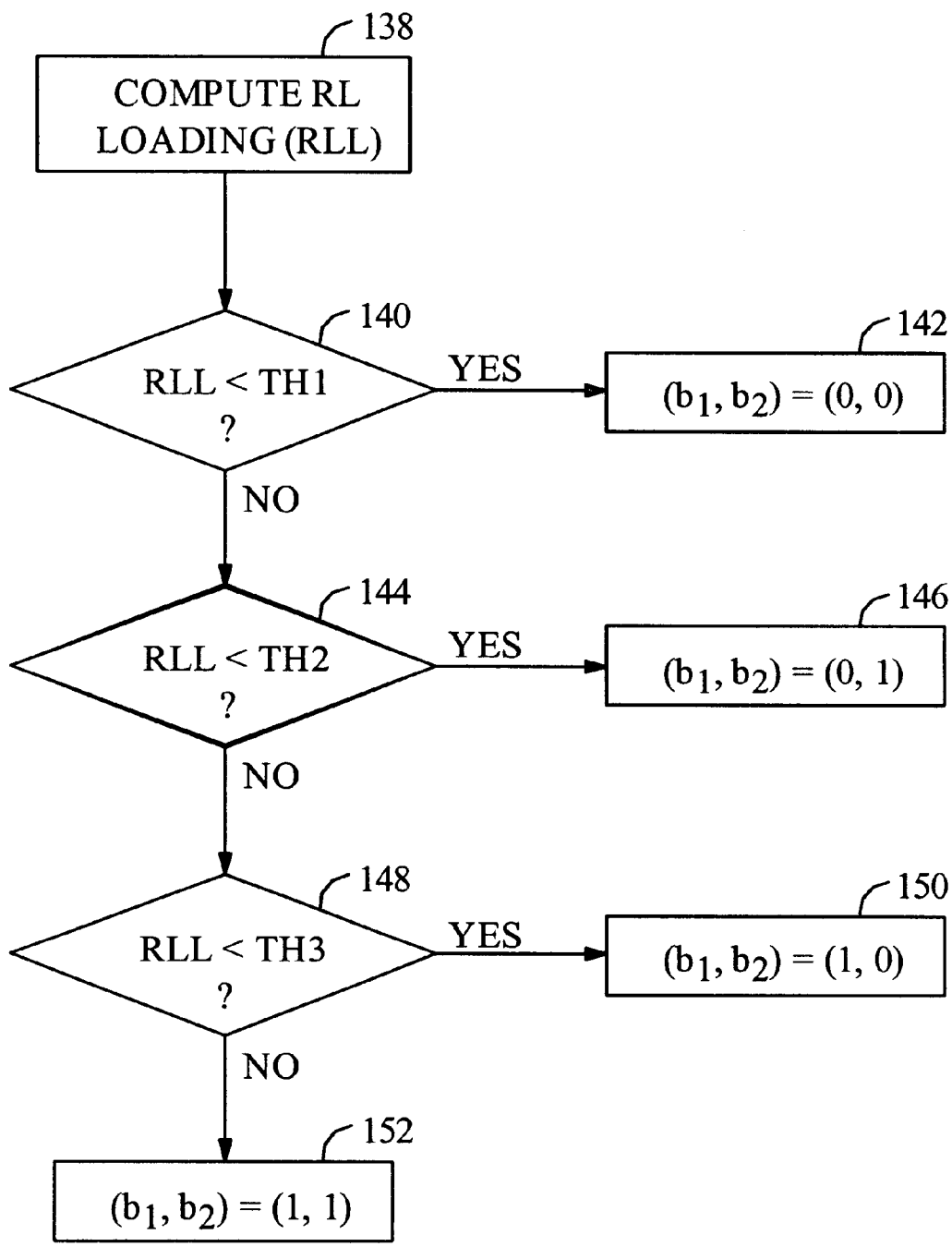

FIG. 1E illustrates an exemplary method for determining the values of the two bit busy tone. In block 138, the base station estimates its reverse link loading. There are pluralities of methods for estimating reverse link loading all of which are applicable to the present invention. The exemplary embodiment for estimating reverse link loading is described in detail in U.S. patent application Ser. No. 09/204,616, entitled "Method and Apparatus for Loading Estimation", now U.S. Pat. No. 6,192,249, issued Feb. 20, 2001, by Roberto Padovani, which is assigned to the assignee of the present invention and incorporated by reference herein.

In block 140, the base station compares the estimated reverse link loading to a first threshold value (TH1). If the estimated reverse link loading is less than the threshold value TH1, then the base station reverse link is determined to be scarcely loaded and in block 142, the busy tone bits are set to (0,0). If the estimated reverse link loading is greater than or equal to TH1 then the operation moves to block 144.

In block 144, the base station compares the estimated reverse link loading to a second threshold value (TH2). If the estimated reverse link loading is less than the threshold value TH2, then the base station reverse link is determined to be stable and in block 146, the busy tone bits are set to (0,1). If the estimated reverse link loading is greater than or equal to TH2 then the operation moves to block 148.

In block 148, the base station compares the estimated reverse link loading to a third threshold value (TH3). If the estimated reverse link loading is less than the threshold value TH3, then the base station reverse link is determined to be heavily loaded and in block 150, the busy tone bits are set to (1,0). If the estimated reverse link loading is greater than or equal to TH3 then the operation moves to block 152. In block 152, the base station is determined to be over loaded and the busy tones are set to (1,1).

All of the threshold comparisons can be implemented through hysteresis cycles to prevent too frequent crossing.

In block 106, the subscriber station receives the busy tones from all of the base stations in its active set and selects the highest busy tone.

Figure 1F:
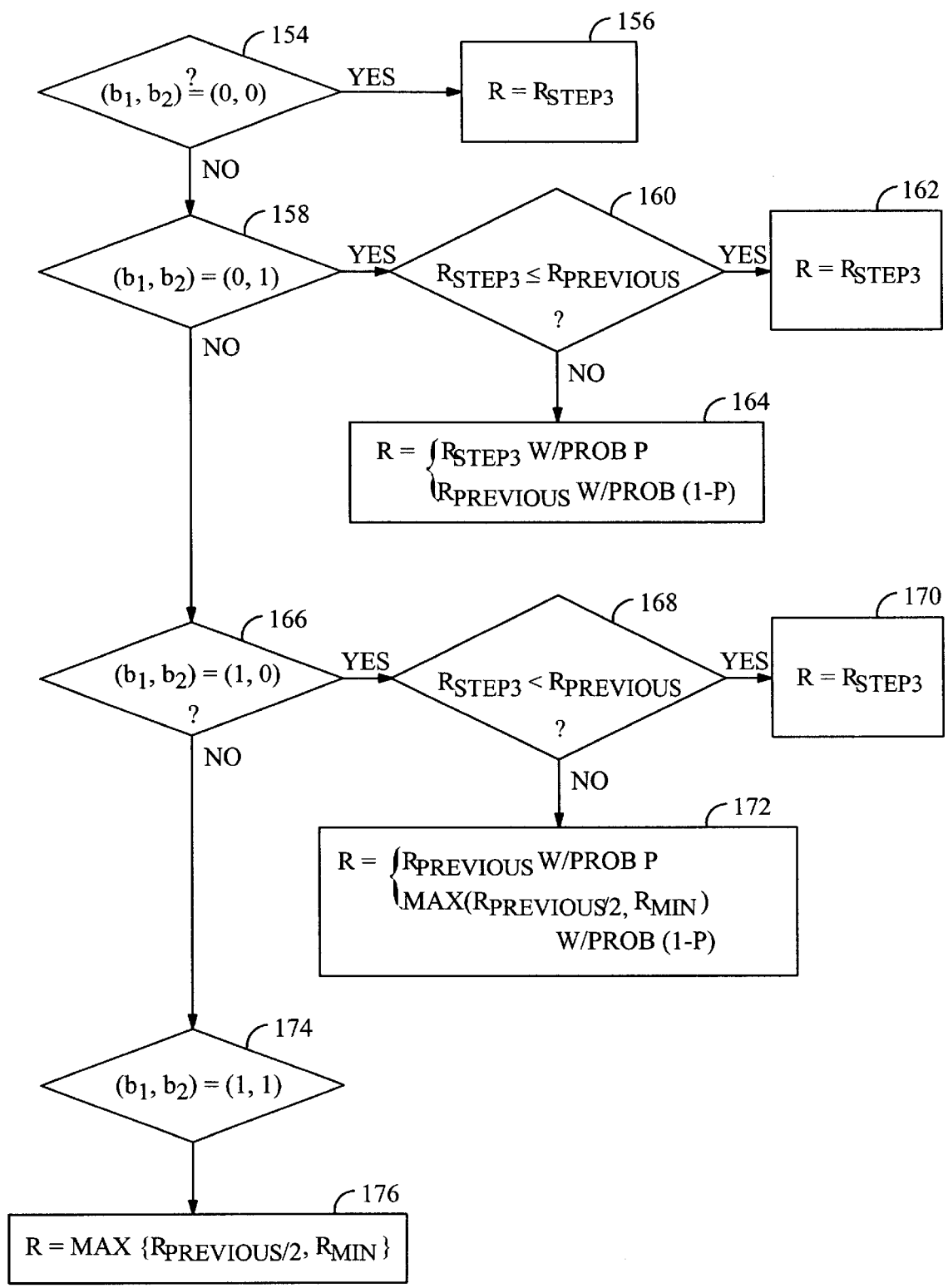

In block 108, the rate of transmission for the current packet is selected in accordance with the maximum busy tone (b1,b2) selected in step 106. FIG. 1F illustrates the method of rate selection based on the selected maximum busy tone.

In control block 154, the subscriber station determines whether the maximum busy tone ($b_1,b_2$) has the value (0,0), which would indicate that all the base stations in its active set are scarcely loaded. In this case, deterministic rate increase is possible; the operation moves to control block 156, and the rate of transmission of the packet is set to $R_{step3}$. If the maximum busy tone does not have the value (0,0), the operation moves to control block 158.

In control block 158, the subscriber station determines whether the maximum busy tone ($b_1,b_2$) has the value (0,1), which would indicate that at least one base station in its active set is stable (but not scarcely loaded). If the maximum busy tone has the value (0,1), the operation moves to control block 160, where stochastic rate increase is possible. In control block 160, the subscriber station determines whether the computed rate $R_{step3}$ is less than or equal to $R_{previous}$. If $R_{step3}$ is less than or equal to $R_{previous}$ then in block 162 the current packet is transmitted at rate $R_{step3}$. If $R_{step3}$ is greater than $R_{previous}$, then in block 164 the current packet is transmitted at a stochastically determined rate such that the packet is transmitted at rate $R_{step3}$ with probability p or is transmitted at rate $R_{previous}$ with probability 1-p. If the maximum busy tone does not have the value (0,1), the operation moves to control block 166.

In the exemplary embodiment, the probability (p) of increasing the transmission rate of the subscriber station is determined in accordance with past activity of the subscriber station and on the buffer nearly full flag ($F_{buffer}$). In particular, in the exemplary embodiment, the probability is determined in accordance with the average rate used in a predetermined number of previous packets, $R_{average}$. In the exemplary embodiment, the probability is determined in accordance with the equation:

$$p = \min\left\{1, \frac{1 + F_{Buffer}/2}{N_{rates}} \log_2 \frac{R_{\max}}{R_{average}}\right\}, \quad (5)$$

where $F_{buffer}$ is the buffer full flag that in the exemplary embodiment assumes a value of zero or one where one indicates the buffer full condition, $R_{max}$ as described previously is the maximum transmission rate of the subscriber station, $N_{rates}$ is the number of rates available for the subscriber station.

In control block 166, the subscriber station determines whether the maximum busy tone ($b_1,b_2$) has the value (1,0), which would indicate that at least one base station in its active set is heavily loaded. If the maximum busy tone has the value (1,0), the operation moves to control block 168, in which stochastic rate decrease is necessary. In control block 168, the subscriber station determines whether the computed rate $R_{step3}$ is less than $R_{previous}$. If $R_{step3}$ is less than $R_{previous}$, then in block 170 the current packet is transmitted at rate $R_{step3}$. If $R_{step3}$ is greater than or equal to $R_{previous}$, then in block 172 the current packet is transmitted at a stochastically determined rate such that the packet is transmitted at rate $R_{previous}$ with probability p or is transmitted at the greater of $R_{previous}/2$ or $R_{min}$ with probability 1-p. In the exemplary embodiment, the number p is again computed according to equation (5).

If the maximum busy tone does not have the value (1,0), the operation moves to block 176 which indicates that the at least one base station in the active set of the subscriber station is in an overload condition. In block 176, the transmission rate of the current packet is determined to be the greater of $R_{previous}/2$ or $R_{min}$.

II. Network Description

Figure 2:
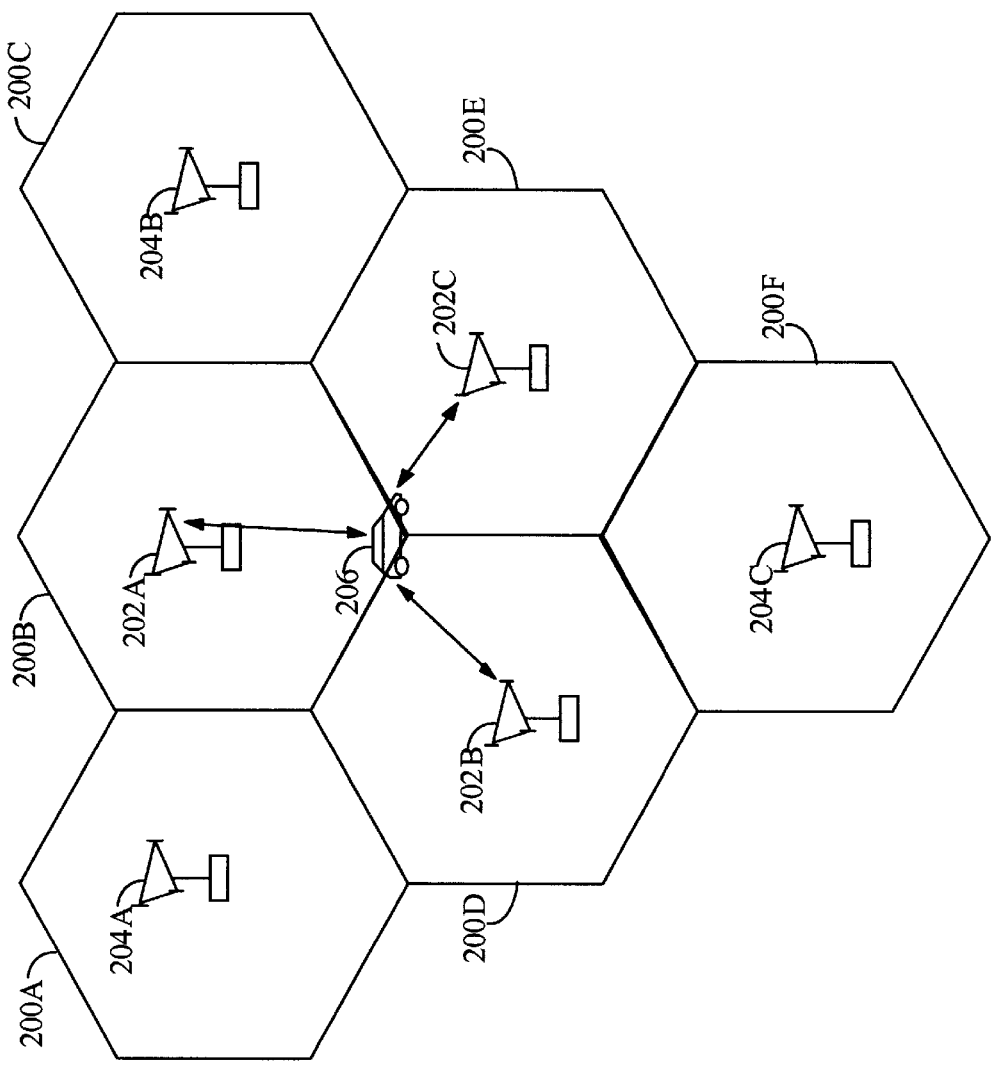
FIG. 2 is a diagram illustrating the basic elements of the wireless communication system network of the present invention.

Referring to the figures, FIG. 2 represents the exemplary data communication system of the present invention which comprises multiple cells 200a–200f. Each cell 200 is serviced by a corresponding base station 202 or base station 204. Base stations 202 are base stations that are in active communication with subscriber station 206 and are said to make up the active set of subscriber station 206. Base stations 204 are not in communication with subscriber station 206 but have signals with sufficient strength to be monitored by subscriber station 206 for addition to the active set if the strength of the received signals increases due to a change in the propagation path characteristics. Base stations 204 are said to make up the candidate set of subscriber station 206.

In the exemplary embodiment, subscriber station 206 receives data information from at most one base station 202 on the forward link at each time slot, but it receives busy tone information from all base stations in the active set. Also, the subscriber station communicates with all base stations in the active set 202 on the reverse link. If the number of active base stations is more than one, the subscriber station 206 is in soft handoff. Subscriber stations 206, especially those located near a cell boundary, can receive the pilot signals from multiple base stations 204 in the candidate set. If the pilot signal is above a predetermined threshold, subscriber station 206 can request that base station 204 be added to the active set of subscriber station 206. In the exemplary embodiment, before the candidate base station 204 is added to the active set, there is typically no way for the subscriber station to monitor its busy tone. If a way is provided to monitor the busy tone of a candidate base station, then this busy tone enters the set inside of which a maximum is selected according to step 106 described above.

III. Forward Link Structure

Figure 3A:
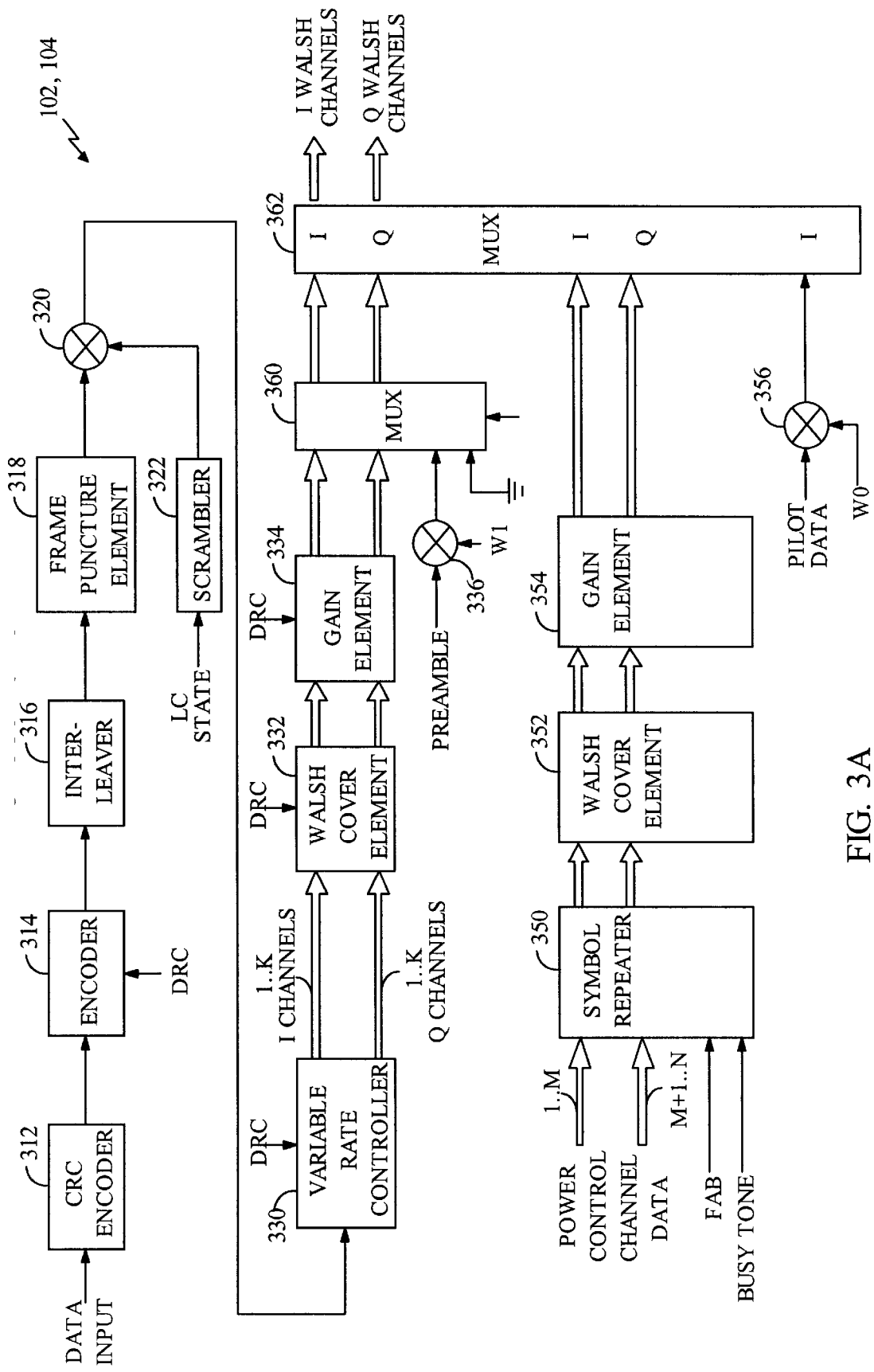
FIGS. 3A–3B are block diagrams illustrating the base station of the exemplary embodiment of the present invention.

A block diagram of the exemplary forward link architecture of the present invention is shown in FIG. 3A. The data is partitioned into data packets and provided to CRC encoder 312. For each data packet, CRC encoder 312 generates frame check bits (e.g., the CRC parity bits) and inserts the code tail bits. The formatted packet from CRC encoder 312 comprises the data, the frame check and code tail bits, and other overhead bits which are described below. The formatted packet is provided to encoder 314 which, in the exemplary embodiment, encodes the data in accordance with a convolutional or turbo encoding format. The encoded packet from encoder 314 is provided to interleaver 316 which reorders the code symbols in the packet. The interleaved packet is provided to frame puncture element 318 which removes a fraction of the packet in the manner described below. The punctured packet is provided to multiplier 320 which scrambles the data with the scrambling sequence from scrambler 322. The output from multiplier 320 comprises the scrambled packet.

The scrambled packet is provided to variable rate controller 330 which demultiplexes the packet into K parallel inphase and quadrature channels, where K is dependent on the data rate. In the exemplary embodiment, the scrambled packet is first demultiplexed into the inphase (I) and quadrature (Q) streams. In the exemplary embodiment, the I stream comprises even indexed symbols and the Q stream comprises odd indexed symbol.

Each stream is further demultiplexed into K parallel channels such that the symbol rate of each channel is fixed for all data rates. The K channels of each stream are provided to Walsh cover element 332 which covers each channel with a Walsh function to provide orthogonal channels. The orthogonal channel data is provided to gain element 334 which scales the data to maintain a constant total-energy-per-chip (and hence constant output power) for all data rates. The scaled data from gain element 334 is provided to multiplexer (MUX) 360 which multiplexes the data with a preamble sequence. The output from MUX 360 is provided to multiplexer (MUX) 362 which multiplexes the traffic data, the power control bits, and the pilot data. The output of MUX 362 comprises the I Walsh channels and the Q Walsh channels.

The reverse link power control (RPC) bits are provided to symbol repeater 350 which repeats each RPC bit a predetermined number of times. The repeated RPC bits are provided to Walsh cover element 352 which covers the bits with the Walsh covers corresponding to the RPC indices. The covered bits are provided to gain element 354 which scales the bits prior to modulation so as to maintain a constant total transmit power.

In addition, a forward activity bit is provided to symbol repeater 350. The forward activity bit alerts subscriber station 106 to a forthcoming blank frame in which the base station will not transmit forward link data. This transmission is made in order to allow subscriber station 106 to make a better estimate of the C/I of the signal from base stations 102. The repeated versions of the forward activity bit are Walsh covered in Walsh cover element 352 so as to be orthogonal to the Walsh covered power control bits. The covered bits are provided to gain element 354 which scales the bits prior to modulation so as to maintain a constant total transmit power.

In addition, a busy tone is provided to symbol repeater 350. The busy tone alerts subscriber station 206 to a reverse link loading condition. In an exemplary embodiment, the busy tone is a single bit indicative of the reverse link being fully loaded or having spare capacity. In the preferred embodiment, the busy tone is a two bit signal indicative of a request by base stations 202 for subscriber stations 206 in its coverage area to either deterministically increase or decrease the rate of their reverse link transmissions, or to stochastically increase or decrease the rate of their reverse link transmissions. The repeated versions of the busy tone is Walsh covered in Walsh cover element 352 so as to be orthogonal to the Walsh covered power control bits and forward activity bit. The covered bit is provided to gain element 354 which scales the bits prior to modulation so as to maintain a constant total transmit power.

The pilot data comprises a sequence of all zeros (or all ones) which is provided to multiplier 356. Multiplier 356 covers the pilot data with Walsh code $W_0$. Since Walsh code $W_0$ is a sequence of all zeros, the output of multiplier 356 is the pilot data. The pilot data is time multiplexed by MUX 362 and provided to the I Walsh channel which is spread by the short $PN_I$ code within complex multiplier 366 (see FIG. 3B). In the exemplary embodiment, the pilot data is not spread with the long PN code, which is gated off during the pilot burst by MUX 376, to allow reception by all subscriber stations 206. The pilot signal is thus an unmodulated BPSK signal.

Figure 3B:
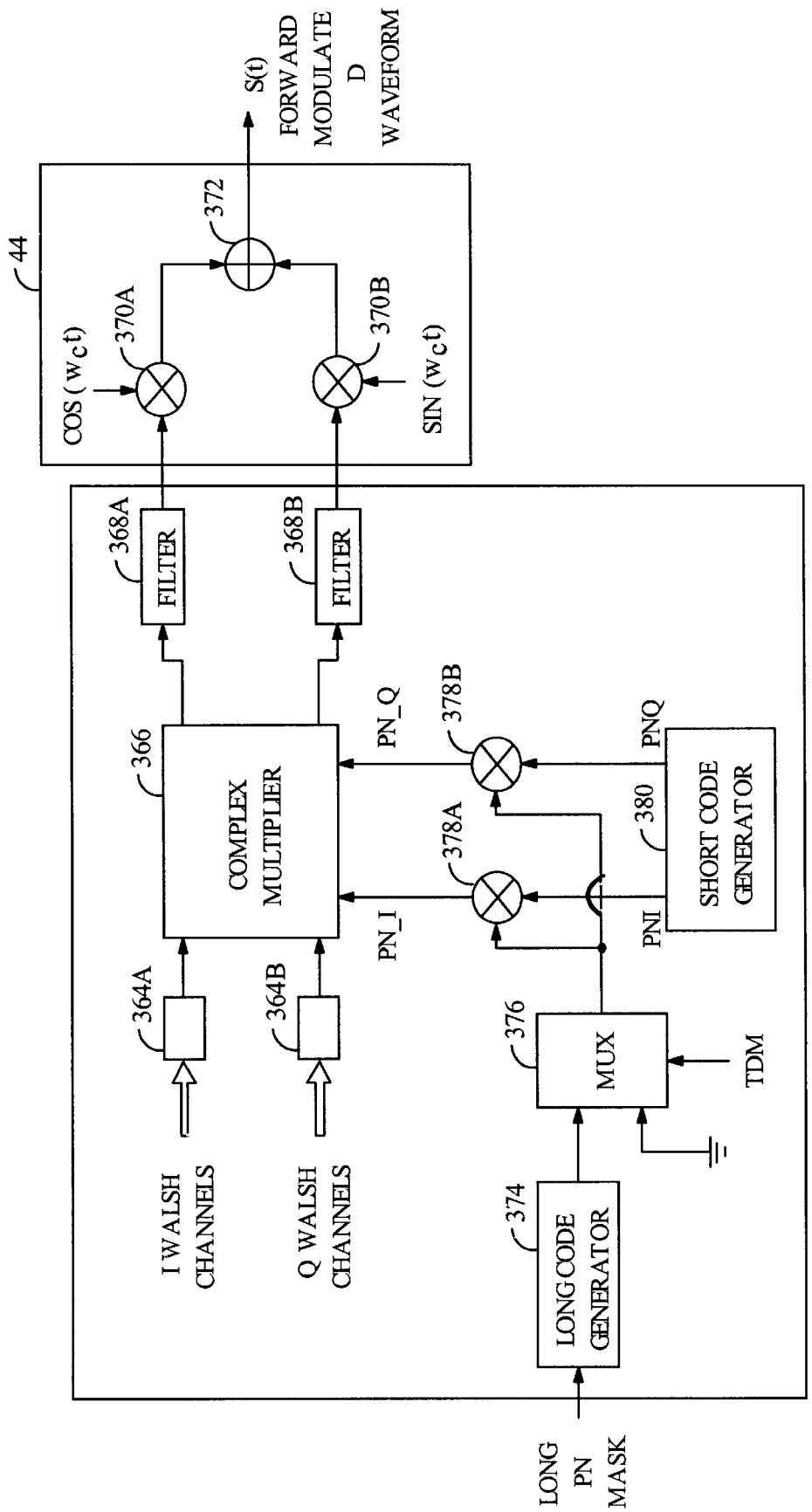

A block diagram of the exemplary modulator used to modulate the data is illustrated in FIG. 3B. The I Walsh channels and Q Walsh channels are provided to summers 364a and 364b, respectively, which sum the K Walsh channels to provide the signals $I_{sum}$ and $Q_{sum}$, respectively. The $I_{sum}$ and $Q_{sum}$ signals are provided to complex multiplier 366. Complex multiplier 366 also receives the PN_I and PN_Q signals from multipliers 378a and 378b, respectively, and multiplies the two complex inputs in accordance with the following equation:

$$(I_{mult}+jQ_{mult})=(I_{sum}+jQ_{sum})\cdot(PN\_I+jPN\_Q)=(I_{sum}\cdot PN\_I-Q_{sum}\cdot PN\_Q)+j(I_{sum}\cdot PN\_Q+Q_{sum}\cdot PN\_I), \quad (6)$$

where $I_{mult}$ and $Q_{mult}$ are the outputs from complex multiplier 366 and j is the complex representation. The $I_{mult}$ and $Q_{mult}$ signals are provided to filters 368a and 368b, respectively, which filter the signals. The filtered signals from filters 368a and 368b are provided to multipliers 370a and 370b, respectively, which multiply the signals with the inphase sinusoid $COS(w_c t)$ and the quadrature sinusoid $SIN(w_c t)$, respectively. The I modulated and Q modulated signals are provided to summer 372 which sums the signals to provide the forward modulated waveform S(t).

In the exemplary embodiment, the data packet is spread with the long PN code and the short PN codes. The long PN code scrambles the packet such that only the subscriber station 206 for which the packet is destined is able to descramble the packet. In the exemplary embodiment, the pilot and power control bits and the control channel packet are spread with the short PN codes but not the long PN code to allow all subscriber stations 206 to receive these bits. The long PN sequence is generated by long code generator 374 and provided to multiplexer (MUX) 376. The long PN mask determines the offset of the long PN sequence and is uniquely assigned to the destination subscriber station 206. The output from MUX 376 is the long PN sequence during the data portion of the transmission and zero otherwise (e.g. during the pilot and power control portion). The gated long PN sequence from MUX 376 and the short $PN_I$ and $PN_Q$ sequences from short code generator 380 are provided to multipliers 378a and 378b, respectively, which multiply the two sets of sequences to form the PN_I and PN_Q signals, respectively. The PN_I and PN_Q signals are provided to complex multiplier 366.

The block diagram of the exemplary traffic channel shown in FIGS. 3A and 3B is one of numerous architectures which support data encoding and modulation on the forward link. Other architectures, such as the architecture for the forward link traffic channel in the CDMA system which conforms to the IS-95 standard, can also be utilized and are within the scope of the present invention.

IV. Forward Link Frame Structure

Figure 4A:
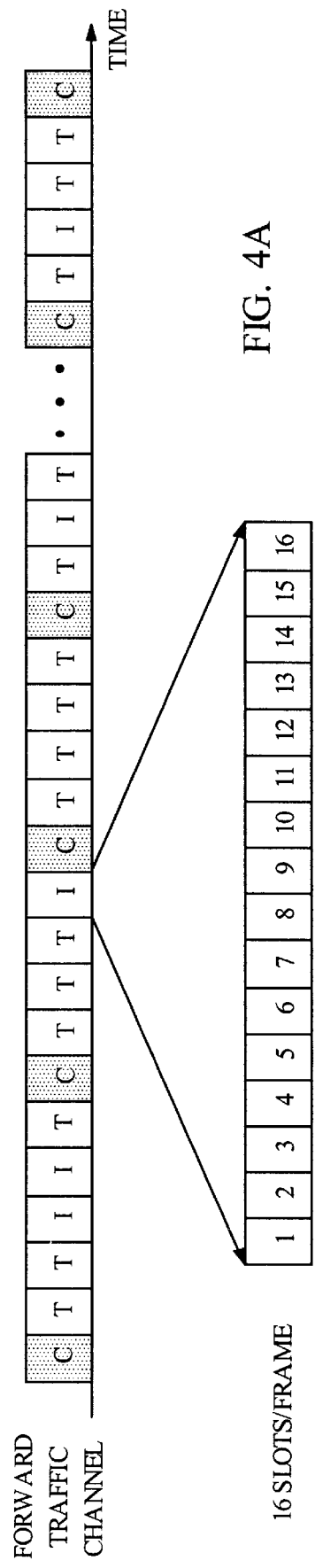
FIGS. 4A–4B are frame diagrams illustrating the exemplary forward link frame format of the present invention.

A diagram of the exemplary forward link frame structure of the present invention is illustrated in FIG. 4A. The traffic channel transmission is partitioned into frames which, in the exemplary embodiment, are defined as the length of the short PN sequences or 26.67 msec. Each frame can carry control channel information addressed to all subscriber stations 206 (control channel frame), traffic data addressed to a particular subscriber station 206 (traffic frame), or can be empty (idle frame). The content of each frame is determined by the scheduling performed by the transmitting base station 102. In the exemplary embodiment, each frame comprises 16 time slots, with each time slot having a duration of 1.667 msec. A time slot of 1.667 msec is adequate to enable subscriber station 206 to perform the C/I measurement of the forward link signal. A time slot of 1.667 msec also represents a sufficient amount of time for efficient packet data transmission.

In the exemplary embodiment, each forward link data packet comprises 1024 or 2048 bits. Thus, the number of time slots required to transmit each data packet is dependent on the data rate and ranges from 16 time slots for a 38.4 Kbps rate to 1 time slot for a 1.2288 Mbps rate.

Figure 4B:
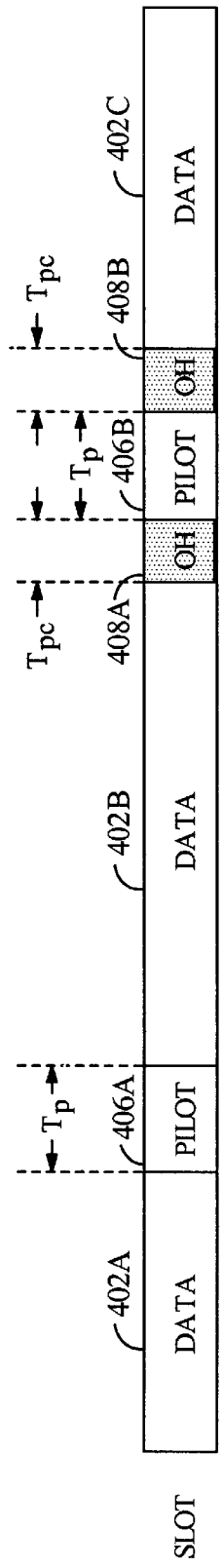

An exemplary diagram of the forward link slot structure of the present invention is shown in FIG. 4B. In the exemplary embodiment, each slot comprises three of the four time multiplexed channels, the traffic channel, the control channel, the pilot channel, and the overhead control channel. In the exemplary embodiment, the pilot signal is transmitted in two bursts and the overhead control channel is transmitted on either side of the second pilot burst. The traffic data is carried in three portions of the slot (402a, 402b and 402c).

The first pilot burst 406a is time multiplexed into the first half of the slot by multiplexer 362. The second pilot burst 406b is time multiplexed into the second half of the slot. On either side of the second pilot burst 406b, overhead channel data 408 including the forward activity bit, the busy tones and the power control bits are multiplexed into the slot.

In the exemplary embodiment, the busy tone is a two bit signal, and the busy tone is only set once per frame. In the exemplary embodiment, the busy tone is interleaved among the slots of a frame such that the even slots carry the first bit of the busy tone and the odd slots carry the second bit of the busy tone. Other ways to interleave the busy tone bits are obvious to the skilled in the art and are within the scope of the present invention.

V. Subscriber Station Architecture

Figure 5:
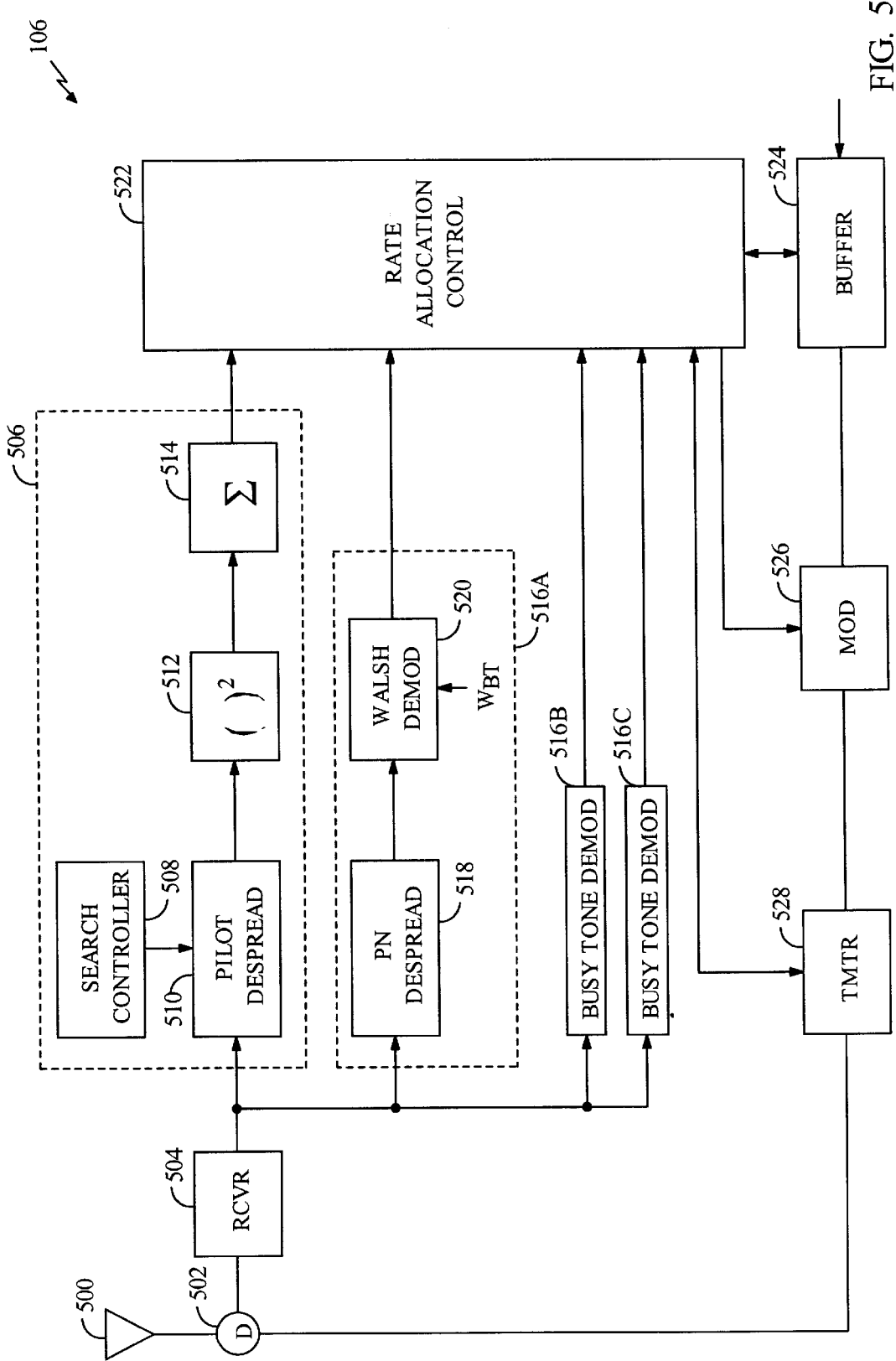
FIG. 5 is a block diagram of the exemplary subscriber station of the present invention.

FIG. 5 illustrates the exemplary subscriber station of the present invention. Buffer 524 provides a signal indicative of the amount of data queued for transmission to rate allocation control processor 522. Rate allocation control processor 522 selects the rate based on the buffer state as described with respect to step 100 above. In the exemplary embodiment, buffer 524 is divided into two parts. A first part of buffer 524 stores new data for transmission. A second part of buffer 524 stores data for retransmission. In the exemplary embodiment, rate control processor 522 selects the rate in accordance with a buffer full flag that is set in accordance with the new data to be transmitted.

Transmitter 528 is responsible for upconverting, filtering and amplifying the reverse link signal for transmission. Transmitter 528 provides a signal to rate allocation control processor 522 indicative of the amount of power headroom available for transmission of the current data packet. In response to this signal rate allocation control processor 522 determines the adjustment to the rate of transmission of the next packet as described with respect to block 102 above.

Forward link signals are received by subscriber station 206 at antenna 500 and provided through duplexer 502 to receiver 504. Receiver 504 downconverts, filters and amplifies the received signal and provides the signal to pilot energy calculator 506. Pilot energy calculator 506 calculates the energy of the pilot signals received from active set base stations 202 and candidate set base stations 204.

The received signals are provided to pilot despreader 510, which despreads the pilot signals in accordance with control signals from search controller 508. In the exemplary embodiment, search controller 508 provides a PN offset of a candidate set or active set base station to pilot despreader 510 which in response despreads the pilot signal from a candidate set base station 204 or active set base station 206.

The despread pilot symbols are provided to squaring element 512 which computes the energy of the symbols and provides the symbol energy values to accumulator 514. Accumulator 514 accumulates the energies over the time interval of the pilot burst and provides the pilot burst energy to rate allocation element 522. In response to the pilot burst energies from the candidate set base stations (Ec/Io) and the pilot burst energies from active set base station (Ea/Io), rate allocation control processor 522 computes the candidate set protection adjustment to the selected rate as described with respect to block 104 above.

The received signals are also provided to busy tone demodulators 516. Busy tone demodulators 516 demodulate the busy tone values for each active set base station 202 and provide the busy tone values for each base station to rate allocation control processor 522. In response rate allocation control processor 522 selects maximum busy tone as described in 106 above, and calculates the rate of the transmission as described with respect to 108 above.

Once the rate of transmission has been determined by rate allocation control processor 522, a signal indicative of the selected rate is provided to buffer 524, modulator 526 and transmitter 528. Buffer 524 outputs a block of data in accordance with the selected transmission rate to modulator 526. Modulator 526 modulates the signal in accordance with the selected data rate and provides the modulated data to transmitter 528. Transmitter amplifies the signal in accordance with selected transmission rate and provides the signal through duplexer 502 for transmission through antenna 500. The rate selected can be indicated to the active base stations through a reverse link message.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for determining reverse link transmission rate at a subscriber station comprising the steps of:

receiving a busy tone signal indicative of the reverse link loading from a first base station in an active set of said subscriber station;

receiving a busy tone signal indicative of the reverse link loading from a second base station in the active set of said subscriber station;

selecting one of said busy tone signals; and determining said reverse link transmission rate in accordance with said selected one of said busy tone signals.

2. The method of claim 1 wherein said busy tones signals are indicated by an integer value where the loading indicated increases with the value of said integer value and wherein said step of selecting one of said busy tone signals comprises selecting the busy tone signal with the greatest value.

3. The method of claim 2 wherein said busy tone is transmitted as a two bit number and wherein (0,0) indicates a scarcely loaded base station;
(0,1) indicates a stable base station;
(1,0) indicates a heavily loaded base station; and
(1,1) indicates a base station overload condition.

4. A method for determining reverse link transmission rate at a subscriber station comprising the steps of:

selecting an initial rate in accordance with the amount of data queued to be transmitted by said subscriber station;

adjusting said initial rate in accordance with at least one received busy tone value;

determining an energy difference metric in accordance with signal strengths from candidate base stations and active set base stations;

adjusting said initial rate in accordance with said energy difference metric to provide a second adjusted rate; and wherein said step of adjusting said initial rate is performed on said second adjusted rate.

5. The method of claim 4 wherein said step of selecting an initial rate in accordance with the amount of data queued to be transmitted by said subscriber station, comprises the steps of:

determining whether the amount of data queued to be transmitted can be carried in a packet transmitted at the predetermined maximum data rate;

setting said initial rate to the predetermined maximum rate when the amount of data queued to be transmitted exceeds the amount of information that can be carried in a packet transmitted at the predetermined maximum data rate;

setting said initial rate to a second rate which is less than said predetermined maximum rate when the amount of data queued to be transmitted is less than the amount of information that can be carried in a packet transmitted at the predetermined maximum data rate; and setting said initial rate to the less of the current value of the initial rate or twice the rate at which a previous frame was transmitted.

6. A method for determining reverse link transmission rate at a subscriber station comprising the steps of:

selecting an initial rate in accordance with the amount of data queued to be transmitted by said subscriber station;

adjusting said initial rate in accordance with at least one received busy tone value;

determining the amount of power headroom in the subscriber station;

adjusting said initial rate in accordance with said power headroom to provide a second adjusted rate;

wherein said step of adjusting said initial rate is performed on said second adjusted rate;

determining an energy difference metric in accordance with signal strengths from candidate base stations and active set base stations;

adjusting said second adjusted rate in accordance with said energy difference metric to provide a third adjusted rate; and wherein said step of adjusting said initial rate is performed on said third adjusted rate.

7. A method for selecting a data rate for reverse link transmissions, comprising the steps of:

selecting an initial rate in accordance with the amount of data in a transmission buffer;

modifying said initial rate in accordance with a power headroom value to provide a first adjusted rate;

modifying said first adjusted rate in accordance with a candidate set protection value to provide a second adjusted rate; and modifying said second adjusted rate in accordance with a received busy tone value to provide said selected reverse link transmission rate.

8. The method of claim 7 wherein said step of selecting an initial rate, comprises the steps of:

determining whether the amount of data queued to be transmitted can be carried in a packet transmitted at the predetermined maximum data rate;

setting said initial rate to the predetermined maximum rate when the amount of data queued to be transmitted exceeds the amount of information that can be carried in a packet transmitted at the predetermined maximum data rate;

setting said initial rate to a second rate which is less than said predetermined maximum rate when the amount of data queued to be transmitted is less than the amount of information that can be carried in a packet transmitted at the predetermined maximum data rate; and setting said initial rate to the less of the current value of the initial rate or twice the rate at which a previous frame was transmitted.

9. The method of claim 7 wherein said step of selecting an initial rate, comprises the steps of:

determining whether said amount of data in said buffer exceeds a predetermined amount; and setting a flag when said amount of data in said buffer exceeds a predetermined amount.

10. The method of claim 7 wherein said step of selecting an initial rate, comprises the steps of:

determining whether said amount of data in said buffer exceeds a predetermined amount; and setting a flag when said amount of data in said buffer exceeds a predetermined amount.

11. The method of claim 7 wherein said step of modifying said initial rate in accordance with a power headroom value to provide a first adjusted rate, comprises:

determining the maximum power capable of being transmitted by said subscriber station; and selecting the maximum rate capable of being transmitted at or below said maximum power capable of being transmitted by said subscriber station.

12. The method of claim 11 wherein said step of selecting the maximum rate comprises the steps of:

determining whether said subscriber station is in soft handoff; and wherein said step of selecting the maximum rate is performed in accordance with said determination as to determining whether said subscriber station is in soft handoff.

13. The method of claim 11 wherein said step of selecting the maximum rate comprises the steps of:

determining distance between said subscriber station and an active set base station; and wherein said step of selecting the maximum rate is performed in accordance with determining distance between said subscriber station and an active set base station.

14. The method of claim 11 wherein said step of selecting the maximum rate comprises the steps of:

determining the speed of said subscriber station; and
wherein said step of selecting the maximum rate is performed in accordance with the speed of said subscriber station.

15. The method of claim 11 wherein said step of modifying said first adjusted rate in accordance with a candidate set protection value to provide a second adjusted rate, comprising the steps of:
measuring the signal energy of at least one candidate set base station;
measuring the signal energy of at least one active set base station;
computing said candidate set protection value in accordance with said signal energy of at least one active set base station and said signal energy of at least one candidate set base station.

16. The method of claim 15 wherein said step of computing said candidate set protection value in accordance with said signal energy of at least one active set base station and said signal energy of at least one candidate set base station, comprising the steps of:
summing the energies of said signal energy of at least one active set base station to provide a summed active set energy;
summing the energies of said signal energy of at least one candidate set base station to provide a summed candidate set energy;
and wherein said step of computing said candidate set protection value is performed in accordance with the difference between said summed active set energy and said summed active set energy.

17. The method of claim 15 wherein said step of computing said candidate set protection value in accordance with said signal energy of at least one active set base station and said signal energy of at least one candidate set base station, comprising the steps of:
selecting a minimum energy active set base station of said signal energy of at least one active set base station;
selecting a maximum energy candidate set base station of said signal energy of at least one candidate set base station;
and wherein said step of computing said candidate set protection value is performed in accordance with the difference between the signal energy of said minimum energy active set base station and the signal energy of said maximum energy candidate set base station.

18. The method of claim 15 wherein said step of computing said candidate set protection value in accordance with said signal energy of at least one active set base station and said signal energy of at least one candidate set base station, comprising the steps of:
selecting a minimum energy active set base station of said signal energy of at least one active set base station;
summing the energies of said signal energy of at least one candidate set base station to provide a summed candidate set energy; and
wherein said step of computing said candidate set protection value is performed in accordance with the difference between the signal energy of said minimum energy active set base station and said summed active set energy.

19. The method of claim 15 wherein said step of computing said candidate set protection value in accordance with said signal energy of at least one active set base station and said signal energy of at least one candidate set base station, comprising the steps of:

selecting a maximum energy active set base station of said signal energy of at least one active set base station;
selecting a maximum energy candidate set base station of said signal energy of at least one candidate set base station;
and wherein said step of computing said candidate set protection value is performed in accordance with the difference between the signal energy of said maximum energy active set base station and the signal energy of said maximum energy candidate set base station.

20. The method of claim 7 wherein said step of modifying said second adjusted rate in accordance with a received busy tone value to provide said selected reverse link transmission rate is performed in accordance with a stochastic process.

21. The method of claim 20 wherein stochastic process is determined in accordance with the average number rate of transmission over a predetermined prior interval.

22. The method of claim 20 wherein stochastic process is determined in accordance with a buffer capacity flag.

23. The method of claim 22 wherein stochastic process is determined in accordance with the buffer capacity flag.

24. The method of claim 23 wherein the probability of increasing the transmission rate (p) is given by:

$$p = \min\left\{1, \frac{1 + F_{Buffer}/2}{N_{rates}} \log_2 \frac{R_{\max}}{R_{average}}\right\},$$

where R average is the average data rate in a predetermined number of previous transmissions, $F_{Buffer}$ is the buffer full flag that in the exemplary embodiment assumes a value of zero or one where one indicates the buffer full condition, $R_{max}$ as described previously is the maximum transmission rate of the subscriber station, $N_{Rates}$ is the number of rates available for the subscriber station.

25. A subscriber station for transmitting high rate digital data comprising:
receiver for receiving a busy tone signal indicative of the reverse link loading from a first base station in an active set of said subscriber station, and for receiving a busy tone signal indicative of the reverse link loading from a second base station in the active set of said subscriber station; and
control processor for selecting one of said busy tone signals and determining said reverse link transmission rate in accordance with said selected one of said busy tone signals.

26. The subscriber station of claim 25 wherein said busy tones signals are indicated by an integer value where the loading indicated increases with the value of said integer value and wherein said step of selecting one of said busy tone signals comprises selecting the busy tone signal with the greatest value.

27. The method of claim 26 wherein said busy tone is received as a two bit number and wherein
(0,0) indicates a scarcely loaded base station;
(0,1) indicates a stable base station;
(1,0) indicates a heavily loaded base station; and
(1,1) indicates a base station overload condition.

28. A subscriber station for transmitting high speed digital data comprising:
a buffer for storing data for transmission by said subscriber station;
receiver for receiving a busy tone signal indicative of the reverse link loading from a first base station in an active set of said subscriber station, and for receiving a busy tone signal indicative of the reverse link loading from a second base station in the active set of said station; and control processor for selecting one of said busy tone signals and determining said reverse link transmission rate in accordance with said selected one of said busy tone signals and the amount of data in said buffer.

29. The subscriber station of claim 28 further comprising:

wherein said control processor is further for determining the amount of power headroom in the subscriber station and for determining said transmission rate in accordance with said power.

30. The subscriber station of claim 28 wherein said control processor is further for determining an energy difference metric in accordance with signal strengths from candidate base stations and active set base stations and for determining said transmission rate in accordance with said energy difference metric to provide a second adjusted rate.

31. The subscriber station of claim 29 wherein said control processor is further for determining an energy difference metric in accordance with signal strengths from candidate base stations and active set base stations and for determining said transmission rate in accordance with said energy difference metric to provide a second adjusted rate.

32. The subscriber station of claim 28 wherein said control processor determines whether the amount of data queued to be transmitted can be carried in a packet transmitted at the predetermined maximum data rate selecting said transmission rate to a predetermined maximum rate when the amount of data queued to be transmitted exceeds the amount of information that can be carried in a packet transmitted at the predetermined maximum data rate and setting said initial rate to a second rate which is less than said predetermined maximum rate when the amount of data queued to be transmitted is less than the amount of information that can be carried in a packet transmitted at the predetermined maximum data rate.

33. The subscriber station of claim 29 wherein said control processor selects the maximum rate capable of reliable transmission by said subscriber station in accordance with said power headroom and selects the lesser of the initial rate and said maximum rate capable of reliable transmission by said subscriber station as said second adjusted rate.

34. A subscriber station for transmitting data at a selected rate of a set of possible rates, comprising:

buffer for storing an amount of data to be transmitted by said subscriber station;

receiver subsystem for receiving a busy tone signal indicative of a busy tone value;

control processor for selecting an initial rate in accordance with the amount of data in a transmission buffer, modifying said initial rate in accordance with a power headroom value to provide a first adjusted rate, modifying said first adjusted rate in accordance with a candidate set protection value to provide a second adjusted rate, and modifying said second adjusted rate in accordance with a received busy tone value to provide said selected reverse link transmission rate; and transmitter for transmitting data at said selected data rate.

35. The subscriber station of claim 34 wherein said control processor determines whether the amount of data queued to be transmitted can be carried in a packet transmitted at the predetermined maximum data rate, sets said initial rate to the predetermined maximum rate when the amount of data queued to be transmitted exceeds the amount of information that can be carried in a packet transmitted at the predetermined maximum data rate, sets said initial rate to a second rate which is less than said predetermined maximum rate when the amount of data queued to be transmitted is less than the amount of information that can be carried in a packet transmitted at the predetermined maximum data rate and sets said initial rate to the less of the current value of the initial rate or twice the rate at which a previous frame was transmitted.

36. The method of claim 34 wherein said control processor determines whether said amount of data in said buffer exceeds a predetermined amount and sets a flag when said amount of data in said buffer exceeds a predetermined amount.

37. The subscriber station of claim 35 wherein said control processor determines whether said amount of data in said buffer exceeds a predetermined amount sets a flag when said amount of data in said buffer exceeds a predetermined amount.

38. The subscriber station of claim 34 wherein said control processor determines the maximum power capable of being transmitted by said subscriber station and selects the maximum rate capable of being transmitted at or below said maximum power capable of being transmitted by said subscriber station.

39. The subscriber station of claim 38 wherein said control processor determines whether said subscriber station is in soft handoff and wherein said subscriber station selects the maximum rate is performed in accordance with said determination as to whether said subscriber station is in soft handoff.

40. The method of claim 38 wherein said control processor determines a distance between said subscriber station and an active set base station and selects the maximum rate is performed in accordance with determining distance between said subscriber station and an active set base station.

41. The subscriber station of claim 38 wherein said control processor determines the speed of said subscriber station and selects the maximum in accordance with the speed of said subscriber station.

42. The subscriber station of claim 38 wherein said control processor estimates the signal energy of at least one candidate set base station, estimates the signal energy of at least one active set base station, and computes said candidate set protection value in accordance with said signal energy of at least one active set base station and said signal energy of at least one candidate set base station.

43. The subscriber station of claim 42 wherein said control processor sums the energies of said signal energy of at least one active set base station to provide a summed active set energy, sums the energies of said signal energy of at least one candidate set base station to provide a summed candidate set energy, computes said candidate set protection value is performed in accordance with the difference between said summed active set energy and said summed active set energy.

44. The subscriber station of claim 42 wherein said control processor selects a minimum energy active set base station of said signal energy of at least one active set base station, selects a maximum energy candidate set base station of said signal energy of at least one candidate set base station, and computes said candidate set protection value is performed in accordance with the difference between the signal energy of said minimum energy active set base station and the signal energy of said maximum energy candidate set base station.

45. The subscriber station of claim 42 wherein said control processor selects a minimum energy active set base station of said signal energy of at least one active set base station, sums the energies of said signal energy of at least one candidate set base station to provide a summed candidate set energy, and computes said candidate set protection value is performed in accordance with the difference between the signal energy of said minimum energy active set base station and said summed active set energy.

46. The subscriber station of claim 42 wherein said control processor selects a maximum energy active set base station of said signal energy of at least one active set base station, selects a maximum energy candidate set base station of said signal energy of at least one candidate set base station and computes said candidate set protection value is performed in accordance with the difference between the signal energy of said maximum energy active set base station and the signal energy of said maximum energy candidate set base station.

47. The subscriber station of claim 34 wherein control processor selects said transmission rate in accordance with a stochastic process.

48. The subscriber station of claim 47 wherein stochastic process is determined in accordance with the average number rate of transmission over a predetermined prior interval.

49. The subscriber station of claim 47 wherein stochastic process is determined in accordance with the a buffer capacity flag.

50. The method of claim 49 wherein stochastic process is determined in accordance with a buffer capacity flag.

51. The method of claim 50 wherein the probability of increasing the transmission rate (p) is given by:

$$p = \min\left\{1, \frac{1 + F_{Buffer}/2}{N_{rates}} \log_2 \frac{R_{max}}{R_{average}}\right\},$$

where R average is the average data rate in a predetermined number of previous transmissions, $F_{Buffer}$ is the buffer full flag that in the exemplary embodiment assumes a value of zero or one where one indicates the buffer full condition, $R_{max}$ as described previously is the maximum transmission rate of the subscriber station, $N_{Rates}$ is the number of rates available for the subscriber station.

* * * * *

UNITED STATES PATENT AND TRADEMARK OFFICE
CERTIFICATE OF CORRECTION

PATENT NO. : 6,563,810 B1  Page 1 of 1
DATED : May 13, 2003
INVENTOR(S) : Corazza It is certified that error appears in the above-identified patent and that said Letters Patent is hereby corrected as shown below:

<u>Column 16,</u>
Lines 34-40, please delete Claim 10.

<u>Column 18,</u>
Line 54, please change "method" to -- subscriber station --.

<u>Column 20,</u>
Lines 10 and 32, please change "method" to -- subscriber station --.

<u>Column 22,</u>
Lines 7 and 8, please change "method" to -- subscriber station --.

Signed and Sealed this

Twelfth Day of October, 2004

JON W. DUDAS
*Director of the United States Patent and Trademark Office*